United States Patent
Watson et al.

(10) Patent No.: US 10,435,247 B2
(45) Date of Patent: Oct. 8, 2019

(54) TENSIONING SYSTEM AND DRIVE POSITIONING ON A CONVEYOR ASSEMBLY

(71) Applicant: Joy MM Delaware, Inc., Wilmington, DE (US)

(72) Inventors: Charles W. Watson, Paris, KY (US); Michael Nolan, Lexington, KY (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/957,204

(22) Filed: Apr. 19, 2018

(65) Prior Publication Data

US 2018/0305132 A1 Oct. 25, 2018

Related U.S. Application Data

(60) Provisional application No. 62/488,576, filed on Apr. 21, 2017.

(51) Int. Cl.
*B65G 19/10* (2006.01)
*B65G 23/44* (2006.01)

(52) U.S. Cl.
CPC .............. *B65G 23/44* (2013.01); *B65G 19/10* (2013.01); *B65G 2812/02148* (2013.01)

(58) Field of Classification Search
None
See application file for complete search history.

(56) References Cited

U.S. PATENT DOCUMENTS

| | | | | |
|---|---|---|---|---|
| 3,581,588 A * | 6/1971 | Eftefield | ................ | B65G 23/44 474/110 |
| 7,549,531 B2 * | 6/2009 | Hosch | .................. | B65G 21/105 198/493 |
| 7,588,405 B2 * | 9/2009 | Johnson | ................. | B65G 21/02 198/823 |
| 8,640,861 B2 * | 2/2014 | Chellberg | .............. | B65G 23/44 198/813 |
| 9,701,480 B2 * | 7/2017 | Cribiu' | ................... | B65G 23/44 |
| 2002/0074214 A1 | 6/2002 | Klabisch et al. | | |
| 2014/0353128 A1 | 12/2014 | Francisco et al. | | |
| 2017/0101269 A1 | 4/2017 | Hood et al. | | |

OTHER PUBLICATIONS

Extended Search Report from the European Patent Office for related Application No. 18168119.8 dated Sep. 19, 2018 (10 Pages).

* cited by examiner

*Primary Examiner* — Kavel Singh
(74) *Attorney, Agent, or Firm* — Michael Best & Friedrich LLP

(57) ABSTRACT

A conveyor assembly includes a frame having an intake end and a discharge end, the intake end and the discharge end defining a material flow direction therebetween. The conveyor assembly also includes a conveyor supported on the frame and configured to move material along the material flow direction. The conveyor assembly also includes a first non-driven idler shaft coupled to the conveyor at the intake end, a drive shaft coupled to the conveyor at the discharge end, and a tensioning system coupled to the drive shaft and configured to move the drive shaft relative to the idler shaft when the tensioning system is activated.

9 Claims, 7 Drawing Sheets

US 10,435,247 B2

TENSIONING SYSTEM AND DRIVE POSITIONING ON A CONVEYOR ASSEMBLY

CROSS-REFERENCE TO RELATED APPLICATIONS

This application claims priority to U.S. Provisional Application No. 62/488,576, filed Apr. 21, 2017, the entire contents of which are incorporated herein by reference.

FIELD OF THE INVENTION

The present invention relates to mining equipment, in particular a conveyor assembly.

Conveyor assemblies are generally used in mining applications to facilitate the movement of a mined material. Mined material is loaded onto an intake end of the conveyor assembly and conveyed to a discharge end of the conveyor assembly. In moving mined material, the chains that drive the conveyor occasionally become loose. In conventional systems, a tensioning device is provided on the intake end of the conveyor assembly to adjust the chains. The tensioning device moves a non-driven idler shaft at the intake end to adjust the tension, while a drive (e.g., motor) is coupled to a separate drive shaft at the discharge end of the conveyor assembly to drive movement of the conveyor.

SUMMARY

In accordance with one construction, a conveyor assembly includes a frame having an intake end and a discharge end, the intake end and the discharge end defining a material flow direction therebetween. The conveyor assembly also includes a conveyor supported on the frame and configured to move material along the material flow direction. The conveyor assembly also includes a first non-driven idler shaft coupled to the conveyor at the intake end, a drive shaft coupled to the conveyor at the discharge end, and a tensioning system coupled to the drive shaft and configured to move the drive shaft relative to the idler shaft when the tensioning system is activated.

In accordance with another construction, a conveyor assembly includes a frame having a wall, a first sliding plate slidably coupled to the wall, a second sliding plate slidably coupled to the wall, a conveyor supported by the frame, a first non-driven idler shaft coupled to the conveyor, a drive shaft coupled to the conveyor and to the first sliding plate, and a drive motor coupled to the drive shaft and to the second sliding plate.

Other aspects of the invention will become apparent by consideration of the detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. It should be understood that the description of specific constructions is not intended to limit the disclosure from covering all modifications, equivalents, and alternatives falling within the spirit and scope of the disclosure. Also, it is to be understood that the phraseology used herein for the purpose of description and should not be regarded as limiting.

DETAILED DESCRIPTION

Figure 1:
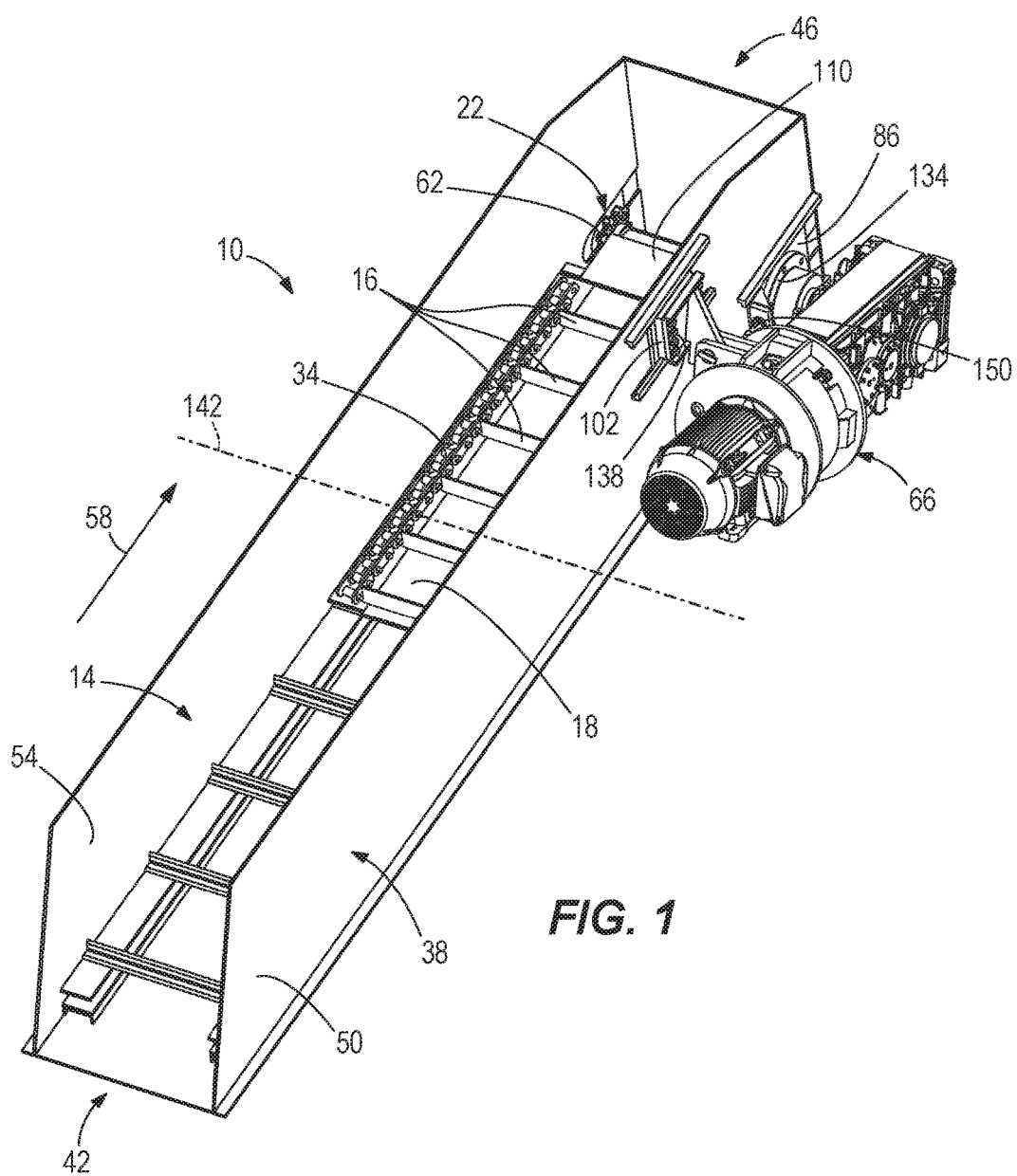
FIG. 1 is a partial perspective view of a conveyor assembly according to one construction.
Figure 2:
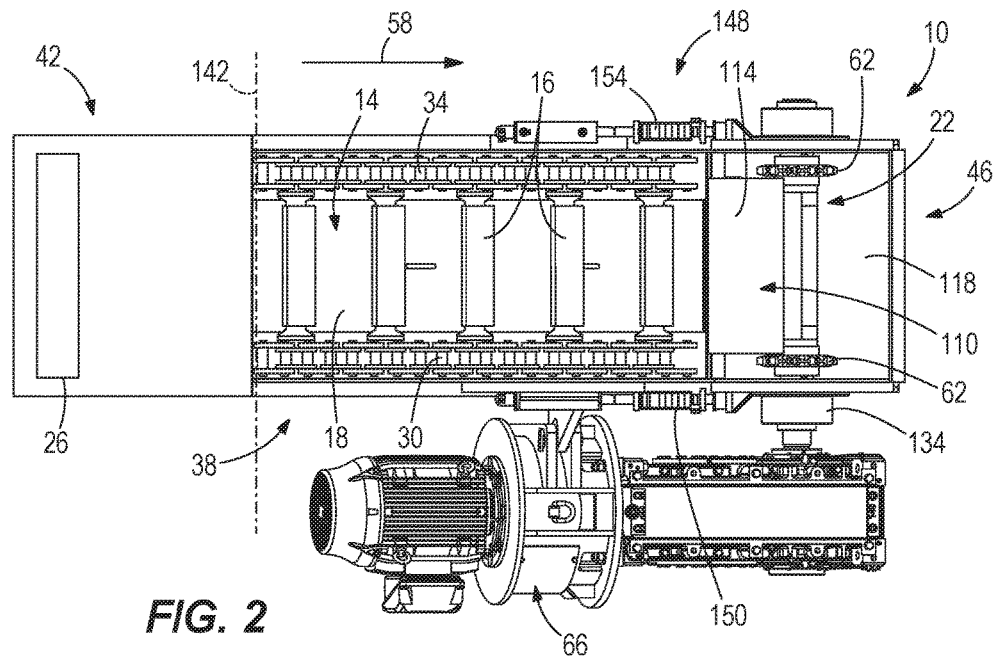
FIG. 2 is a top down, partially schematic view of the conveyor assembly of FIG. 1.
Figure 3:
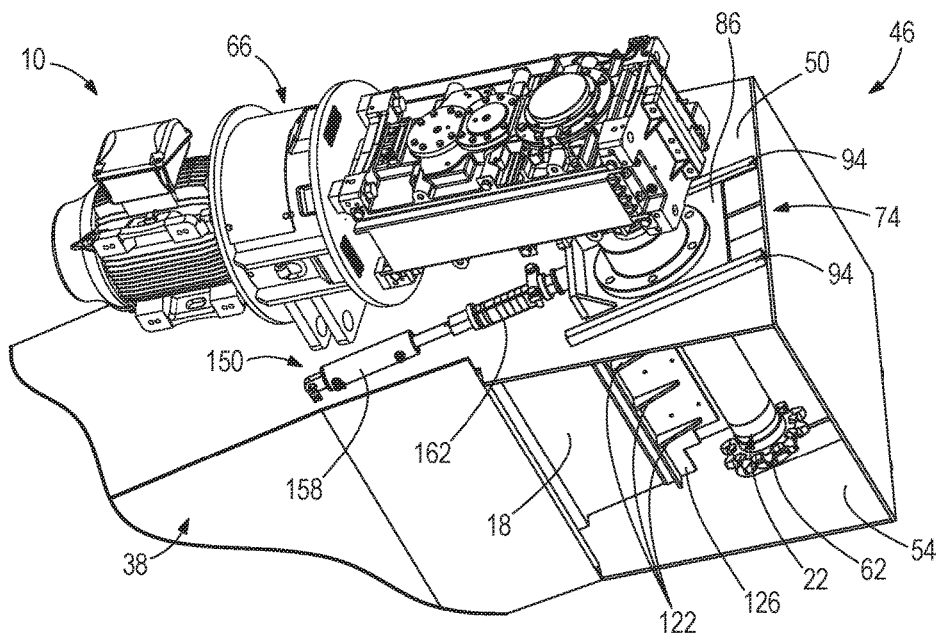
FIG. 3 is a bottom partial perspective view of the conveyor assembly of FIG. 1

FIGS. 1-11 illustrate a conveyor assembly 10 used for transporting mined material (e.g., rocks, minerals, dirt, etc.). As illustrated in FIGS. 1 and 2, the conveyor assembly 10 includes a conveyor 14 having flights 16, a support surface 18 that supports the conveyor 14, a head drive shaft 22 at one end of the conveyor assembly 10, a tail idler shaft 26 (illustrated schematically in FIG. 2) at an opposite end of the conveyor assembly 10, a first chain 30 (FIG. 2) along one side of the conveyor 14 coupled to the flights 16, and a second chain 34 along an opposite side of the conveyor 14 coupled to the flights 16.

The head drive shaft 22, the tail idler shaft 26, and the support surface 18 are supported on a frame 38. The frame 38 includes an intake end 42, a discharge end 46 opposite the intake end 42, a first wall 50 on a first side of the frame 38 (e.g., a right side as viewed in FIG. 1), and a second wall 54 on a second side of the frame 38 (e.g., a left side as viewed from FIG. 1). A material flow direction 58 is generally defined as extending from the intake end 42 of the frame 38 to the discharge end 46 of the frame 38 and is the general direction a mined material travels while the conveyor assembly 10 is in operation. As illustrated in FIG. 2, the tail idler shaft 26 is located generally at the intake end 42 of the frame 38 and acts as an idler. The first chain 30 and the second chain 34 are positioned around the head drive shaft 22 and the tail idler shaft 26. The support surface 18 extends between the head drive shaft 22 and the tail idler shaft 26 and provides support for the conveyor 14.

As illustrated in FIGS. 1 and 2, the first chain 30 is wrapped around a first end of the head drive shaft 22 and around a first end of the tail idler shaft 26. The second chain 34 is wrapped around a second end of the head drive shaft 22 and around a second end of the tail idler shaft 26. Both the head drive shaft 22 and the tail idler shaft 26 each have sprockets 62 on ends of the drive shafts 22, 26 to mesh with the chains 30, 34. The chains 30, 34 are driven by a drive 66 (e.g., motor). The drive 66 rotates the head drive shaft 22 at the discharge end 46, and moves the chains 30, 34. The movement of the chains 30, 34 around the head drive shaft 22 and the tail drive shaft 26 causes the conveyor 14 to transport the mined material.

With reference to FIGS. 5-11, the frame 38 includes two openings 74, 78 at the discharge end 46, a first opening 74 (FIG. 5) on the first wall 50 of the frame 38 and a second opening 78 (FIG. 7) on the second wall 54 of the frame 38. The head drive shaft 22 is positioned in the openings 74, 78, and extends between the first wall 50 of the frame 38 and the second wall 54 of the frame 38. Portions of the head drive shaft 22 extend outside of the frame 38 on both ends of the head drive shaft 22. The openings 74, 78 each have a length 82 (e.g., as illustrated for example by opening 74 in FIGS. 10 and 11) extending parallel to the material flow direction 58.

With reference to FIGS. 5-8, a first sliding plate 86 (FIGS. 5 and 6) and a second sliding plate 90 (FIGS. 7 and 8) are coupled to opposite ends of the head drive shaft 22, on the portions of the head drive shaft 22 located outside of the frame 38. The sliding plates 86, 90 are coupled to sets of rails 94, 98, respectively. The first set of rails 94 is positioned on the outside of the first wall 50 and the second set of rails 98 is positioned on the outside of the second wall 54. The rails 94, 98 allow the sliding plates 86, 90 (and thus the head drive shaft 22) to slide along the length 82 of the openings 74, 78.

Figure 5:
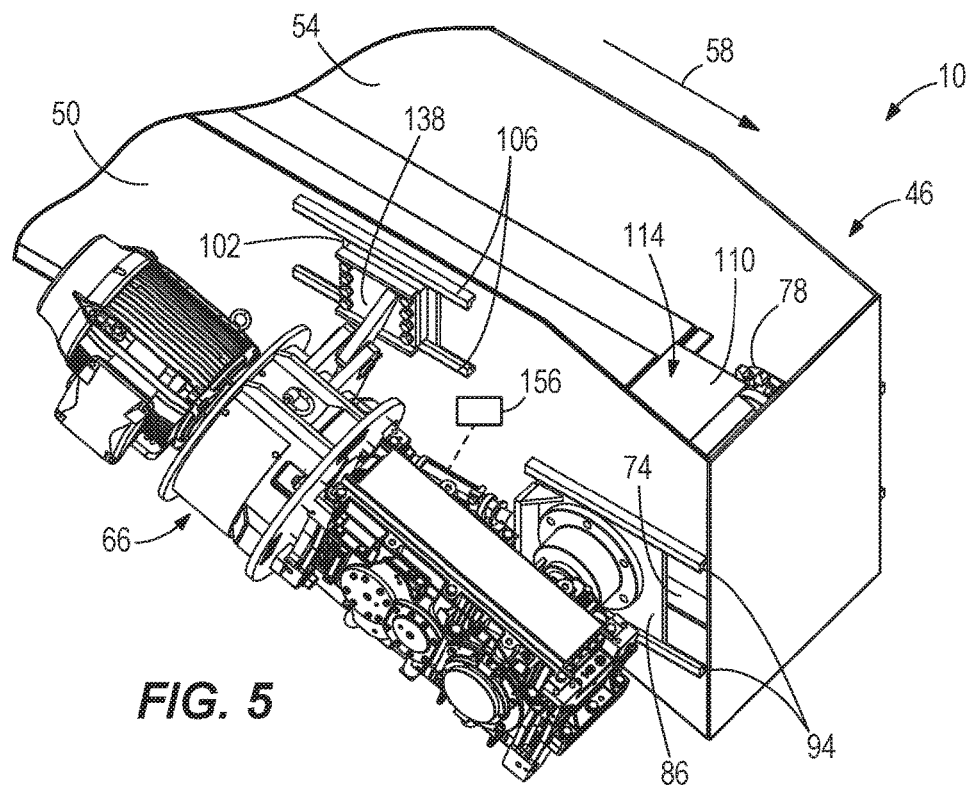
FIG. 5 is a partial perspective view of a first side of the conveyor assembly of FIG. 1 in a first position.
Figure 6:
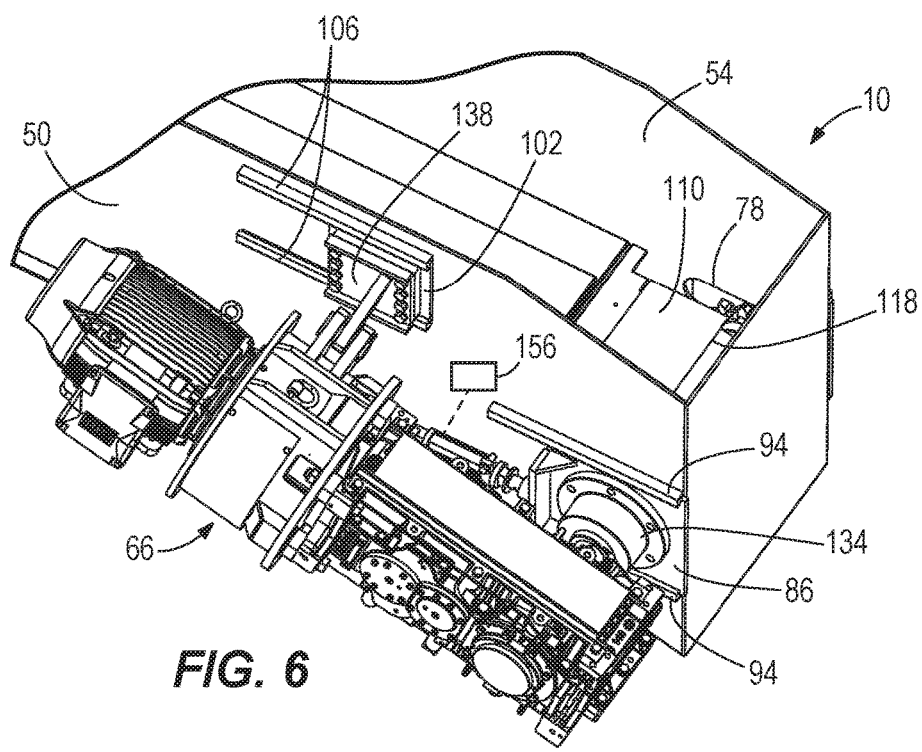
FIG. 6 is a partial perspective view of the first side of the conveyor assembly of FIG. 5 in a second position.

With reference to FIGS. 5 and 6, a third sliding plate 102 is coupled to a third set of rails 106 on the first wall 50 of the frame 38 upstream, in the material flow direction 58, of the first sliding plate 86. The third set of rails 106 are parallel to the first set of rails 94 and the second set of rails 98.

With reference to FIGS. 1-3 and 12, a debris shield 110 (e.g., plate) is supported on the support surface 18 and the head drive shaft 22 of the conveyer 14, and moves with the head drive shaft 22 to inhibit debris from prematurely falling out of the conveyor assembly 10 prior to passing over the head drive shaft 22. The debris shield 110 includes a first end 114 that overlaps and rides along a top of the support surface 18 (and is retained by a keeper, not illustrated) and a second end 118 downstream of the first end 114 in the material flow direction 58. The second end 118 is coupled to the head drive shaft 22, such that the debris shield 110 moves with the head drive shaft 22. In the illustrated construction, the second end 114 is a tube that extends over the head drive shaft 22. Ribs 122 (FIG. 3) extend from the support surface 18, and support a bottom surface 126 of the debris shield 110 as the debris shield 110 moves with the head drive shaft 22. In other constructions, the debris shield 110 includes a telescoping plate, flexible membrane, or other structure that inhibits debris from prematurely falling out of the conveyor assembly 10 prior to passing over the head drive shaft 22.

With reference to FIGS. 1-3 and 5-8, the drive 66 is positioned adjacent the first wall 50 of the frame 38 and includes an output shaft (not shown), a first mounting bracket 134, and a second mounting bracket 138. The first mounting bracket 134 is coupled to the first sliding plate 86 of the head drive shaft 22, and the second mounting bracket 138 is coupled to the third sliding plate 102. As illustrated in FIG. 5, the first mounting bracket 134 and the second mounting bracket 138 mount the drive 66 to the first sliding plate 86 and the third sliding plate 102 with fasteners (e.g., screws, nails, etc.). The drive 66 is thus fixed to the first and third sliding plates 86, 102 so as to slide with the first and third sliding plates 86, 102.

In some constructions, the drive 66 (or portions thereof) and/or the head drive shaft 22 itself also have limited freedom to shift laterally, along a direction that extends between the two side walls 50, 54 and is perpendicular to the material flow direction 58. In such constructions, the drive 66 may be permitted to shift laterally relative to the head drive shaft 22, and/or the head drive shaft 22 may be permitted to shift laterally within the openings 74, 78. The lateral shifting may be minimal and restricted by clearance between the first sliding plate 86 and the first set of rails 94. In some constructions, this lateral shifting may be no more than 0.030 inches.

To efficiently transport mined material from the intake end 42 of the frame 38 to the discharge end 46 of the frame 38, the chains 30, 34 of the conveyor 14 are properly tensioned. Proper conveying tension is achieved by adjusting the position of the head drive shaft 22 relative to the tail drive shaft 26. When the head drive shaft 22 and/or the tail drive shaft 26 are positioned farther apart from one another (e.g., farther from a conveyor centerline 142 as illustrated in FIG. 1), the chains 30, 34 are under higher tension (i.e., more tensioned). When the tail drive shaft 26 and the head drive shaft 22 are positioned closer to each other (e.g., closer to the conveyor centerline 142), the chains 30, 34 are under less tension (i.e., less tensioned).

Figure 4:
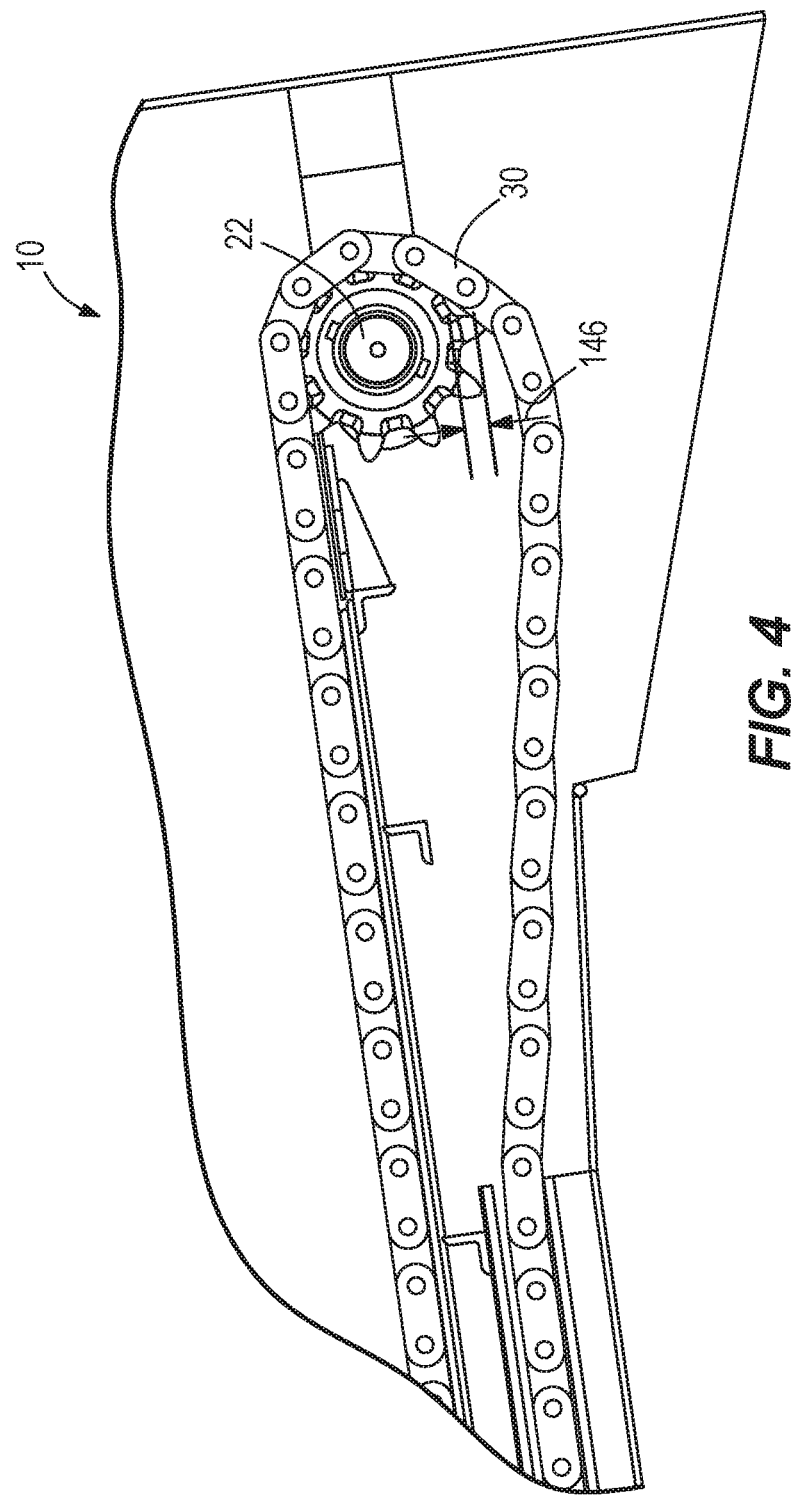
FIG. 4 illustrates the conveyor assembly of FIG. 1 in an improperly tensioned state.

FIG. 4 illustrates the first chain 30 improperly tensioned. The conveyor chains 30, 34 are properly tensioned when a slack distance 146 between the head drive shaft 22 and the conveyor chains 30, 34 is within a predetermined range. The slack distance 146 is visible from behind the head drive shaft 22, and is measured along a direction that is perpendicular to the material flow direction 58. In the illustrated construction, the predetermined distance range for the slack distance 146 is between approximately 15 millimeters (mm) and approximately 50 mm. A slack distance 146 of less than, for example, 15 mm indicates the chains 30, 34 are over-tensioned, and a slack distance 146 of more than 50 mm indicates the chains 30, 34 are under-tensioned. In other constructions, the predetermined distance range may be different based on, for example, the length of the conveyor 14 and/or the weight of the material being transported by the conveyor 14. FIG. 4 illustrates a slack distance 146 between the head drive shaft 22 and the first chain 30 that exceeds the predetermined distance range. In the example of FIG. 4, the slack distance 146 is approximately 55 mm.

Figure 7:
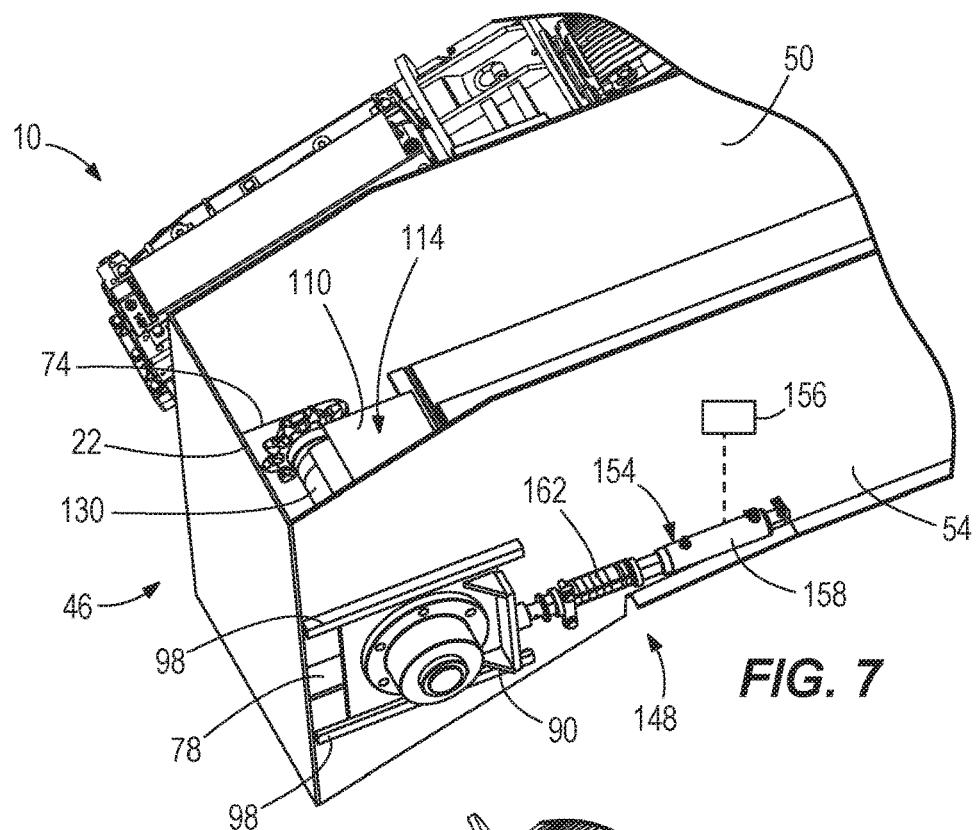
FIG. 7 is a partial perspective view of a second side of the conveyor assembly of FIG. 1 in a first position.
Figure 8:
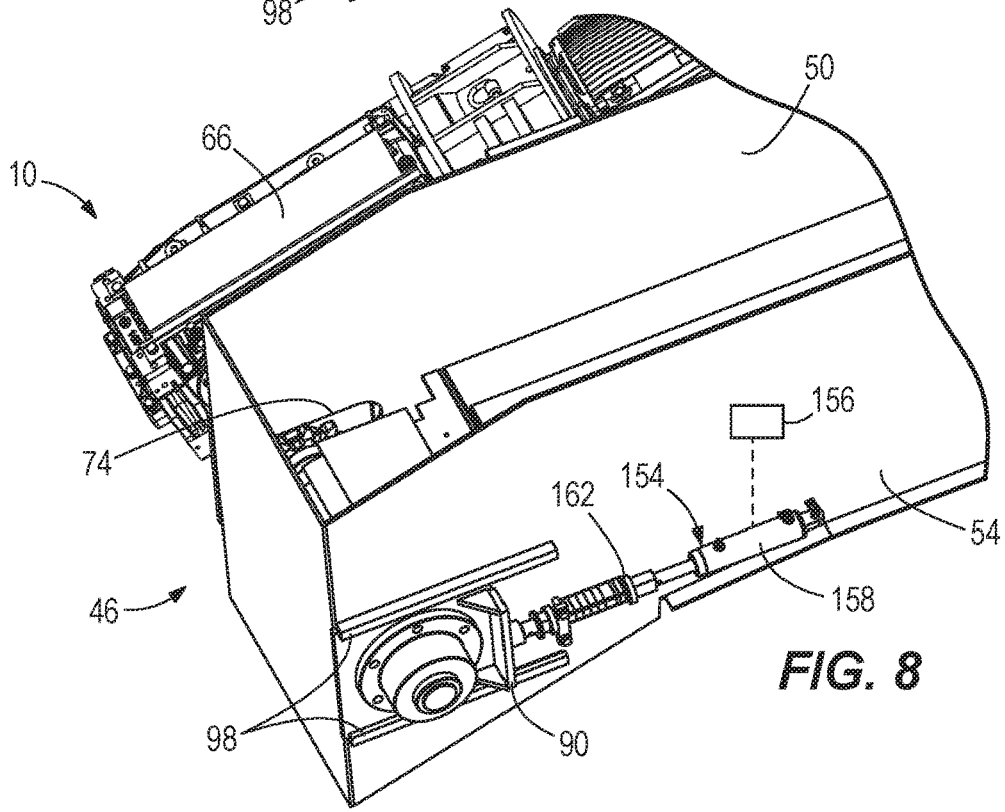
FIG. 8 is a partial perspective view of the second side of the conveyor assembly of FIG. 7 in a second position.
Figure 9:
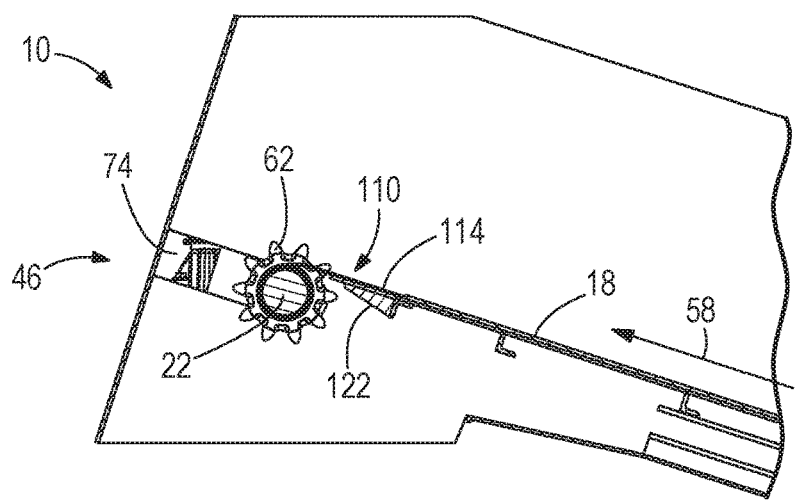
FIG. 9 is a side view of the conveyor assembly of FIG. 1, with portions removed, illustrating a head drive shaft in a first position.
Figure 10:
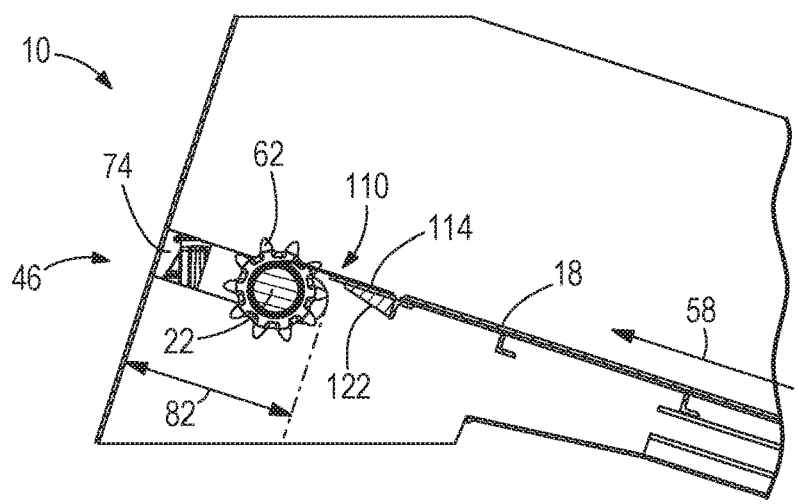
FIG. 10 is a side view of the conveyor assembly of FIG. 9, with portions removed, illustrating the head drive shaft in a second position.
Figure 11:
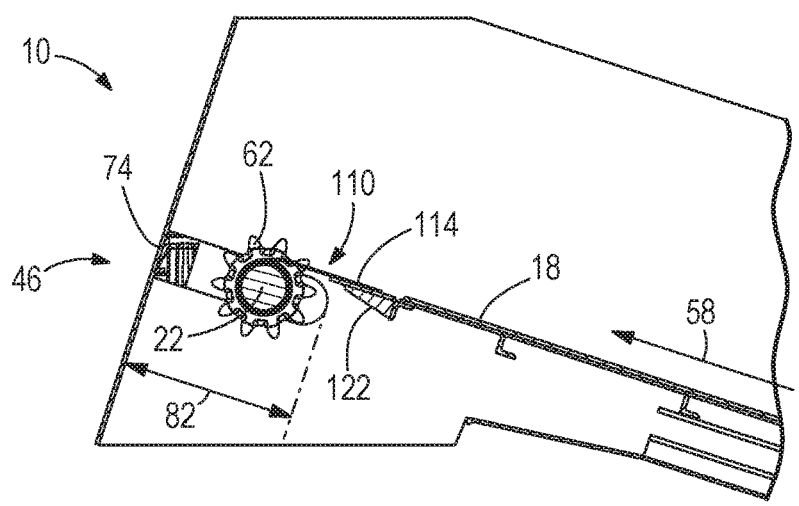
FIG. 11 is a side view of the conveyor assembly of FIG. 9, with portions removed, illustrating the head drive shaft in a third position.
Figure 12:
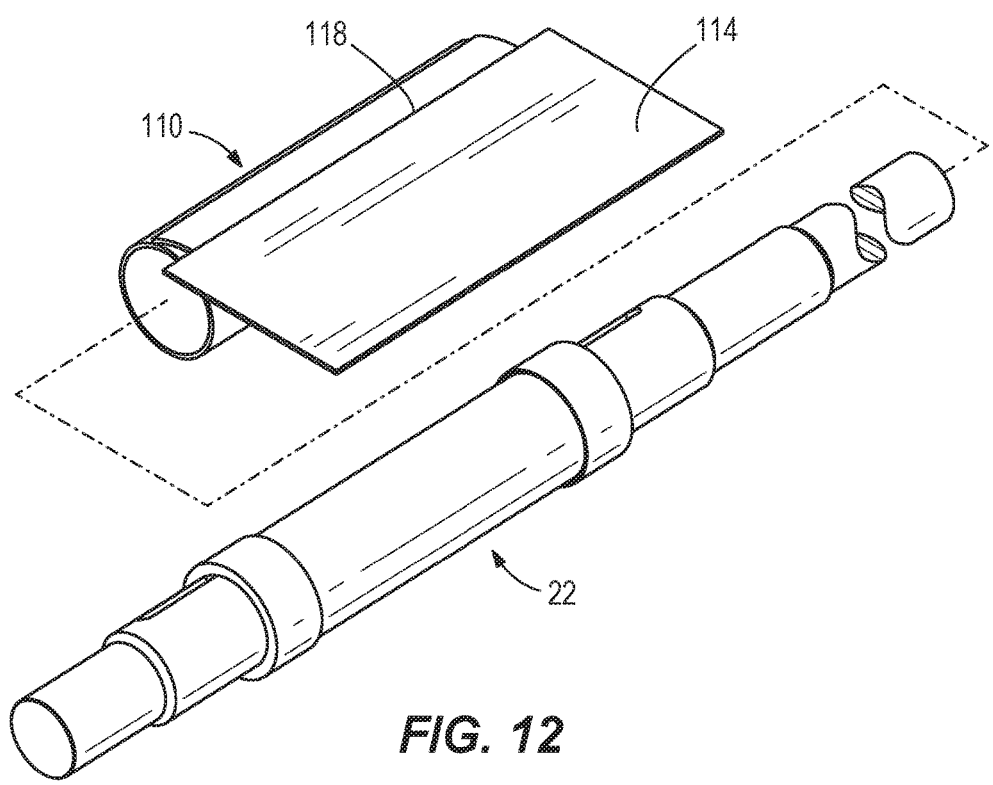
FIG. 12 is a perspective exploded view of the head drive shaft and a debris shield.

With reference to FIGS. 2, 3, 7, and 8, the conveyor assembly 10 includes a tensioning system 148 to automatically shift the head drive shaft 22 relative to the tail drive shaft 26 to properly tension the chains 30, 34. As illustrated in FIG. 2, the tensioning system 148 includes a first tensioning device 150 and a second tensioning device 154. The first tensioning device 150 is coupled to the first sliding plate 86 on the first wall 50 of the frame 38 (FIG. 3) and the second tensioning device 154 is coupled to the second sliding plate 90 on the second wall 54 of the frame 38 (FIGS. 7 and 8). Both the first and second tensioning devices 150, 154 move the respective sliding plates 86, 90, and therefore the head drive shaft 22, in order to change the tensioning of the chains 30, 34. In some constructions, only a single tensioning device is provided to adjust the tension, for example on one side of the conveyor assembly 10.

As illustrated in FIGS. 3 and 5-8, the first tensioning device 150 and the second tensioning device 154 each include a control system 156 (illustrated schematically), a hydraulic system 158 (e.g., hydraulic actuator), and an operating rod 162. The control system 156 controls the hydraulic system 158, for example based on signals received from a sensor or operator, to move the operating rod 162 and thus the first sliding plate 86 or second sliding plate 90. Movement of the first sliding plate 86 or second sliding plate 90 moves the head drive shaft 22 toward or away from the centerline 142 to tension the chains 30, 34 until the chains 30, 34 are properly tensioned. As illustrated for example in FIG. 3, the hydraulic system 158 is coupled (e.g., pivotally coupled or rigidly fixed) at one end to the wall 50.

In some constructions, the same control system 156 operates the hydraulic systems 158 in both of the tensioning devices 150, 154. In the illustrated construction, the chain tensioning devices 150, 154 are automatic tensioning devices (e.g., do not require an operator to operate). In other constructions, the tensioning devices 150, 154 are manual tensioning devices (e.g., require an operator to operate). Other constructions include different tensioning devices (e.g., pneumatic, ratcheting, etc.).

In operation, the mined material is received on the intake end 42 of the frame 38. The conveyor 14 transports the mined material in the material flow direction 58 from the intake end 42 of the frame 38 to the discharge end 46 of the frame 38. If the chains 30, 34 are under-tensioned (e.g., based on signals or operator detection), the hydraulic systems 158 of the tensioning devices 150, 154 are activated. The hydraulic systems 158 move the operating rods 162, which move the head drive shaft 22 of the conveyor 14 away from the tail drive shaft 26 in the material flow direction 58. The operating rods 162 of the tensioning devices 150, 154 push the sliding plates 86, 90 on the sets of rails 94, 98 along the lengths 82 of the openings 74, 78. Both the first and the third sliding plates 86, 102 move along the first and third set of rails 94, 106 respectively to move the drive 66 with the head drive shaft 22 as the tensioning devices 150, 154 move. The tensioning devices 150, 154 operate until sensors send a signal indicating to the control system(s) 156 of the tensioning devices 150, 154 that the slack distance 146 of the chains 30, 34 are within the predetermined distance range to be properly tensioned, or until an operator manually stops operation of the tensioning devices 150, 154.

When the control system(s) 156 of the tensioning devices 150, 154 receive a signal from the sensors on the conveyor assembly 10 indicating that the conveyor 14 is over-tensioned (or when an operator wishes to reduce tension), the hydraulic systems 158 are activated. The hydraulic systems 158 move the operating rods 162 which in turn move the head drive shaft 22 of the conveyor 14 towards the tail drive shaft 26 in the material flow direction 58. The operating rods 162 thus pull the first and second sliding plates 86, 90 on the rails 94, 98. The drive 66 moves with the sliding plates 86, 90 towards the tail drive shaft 26 as the tensioning devices 150, 154 pull the sliding plates 86, 90. The tensioning devices 150, 154 operate until the sensors send a signal indicating to the control systems 156 that the slack distance 146 of the chains 30, 34 are within a predetermined distance range to be properly tensioned, or until an operator manually stops operation of the tensioning devices 150, 154.

With reference to FIGS. 5-8, in some constructions the drive 66 and the head drive shaft 22 may start in a first position (FIGS. 5 and 7). The first position is generally the least tensioned position of the chains 30, 34. The drive 66 and the head drive shaft 22 may then be moved to a second position (FIGS. 6 and 8). The second position is generally the most tensioned position of the chains 30, 34. The tensioning system 148 may move the head drive shaft 22 any distance between the first and second position to properly tension the chains 30, 34.

The conveyor assembly 10 maintains the slack distance 146 within a properly tensioned predetermined distance range. Positioning the drive 66 and the tensioning system 148 together on the discharge end 46 of the frame 38 to move the head drive shaft 22 and to tension the chains 30, 34 allows for easy access to the tensioning system 148, the head drive shaft 22, and/or the drive 46 in the event any of these components requires maintenance. Mined material at the discharge end 46 is also easily cleared to allow access to components of the conveyor assembly 10 (e.g., the drive 66, the tensioning system 148, the conveyor 14, etc.) that need maintenance or repairs. Additionally, the debris shield 110 allows movement of the head drive shaft 22 while still maintaining a conveying surface for the mined material.

In some constructions, the conveyor assembly 10 is part of a mobile crusher. The crusher includes a hopper for providing mined material to the conveyor assembly 10. The conveyor assembly 10 transports the mined material to a crushing mechanism where the mined material is crushed to achieve a target size. The mobile crusher may be mounted on two crawlers for mobility. In further constructions, the crawlers are replaced with wheels suitable for providing mobility in a mining environment. Further, the conveyor assembly 10 may be part of a different mining machine such as, for example, an armored face conveyor or a mobile sizer.

Although the invention has been described in detail with reference to certain preferred constructions, variations and modifications exist within the scope and spirit of one or more independent aspects of the invention as described.

What is claimed is:

1. A conveyor assembly comprising:
   a frame having a wall;
   a first sliding plate slidably coupled to the wall;
   a second sliding plate slidably coupled to the wall;
   a conveyor supported by the frame;
   a first non-driven idler shaft coupled to the conveyor;
   a drive shaft coupled to the conveyor and to the first sliding plate; and
   a drive motor coupled to the drive shaft and to the second sliding plate.

2. The conveyor assembly of claim 1, further comprising a hydraulic actuator coupled to both the wall and to the drive shaft, wherein activation of the hydraulic actuator is configured to cause sliding movement of both the first sliding plate and the second sliding plate.

3. The conveyor assembly of claim 1, wherein the wall includes a first set of rails and a second set of rails, wherein the first sliding plate is configured to slide along the first set of rails and the second sliding plate is configured to slide along the second set of rails.

4. The conveyor assembly of claim 1, wherein the conveyor includes a plurality of flights, wherein the conveyor assembly includes a first chain disposed along a side of the conveyor and coupled to the plurality of flights and a second chain disposed along an opposite side of the conveyor and coupled to the plurality of flights, wherein the first chain is wrapped around both the drive shaft and the idler shaft, and wherein the second chain is wrapped around both the drive shaft and the idler shaft.

5. The conveyor assembly of claim 1, further comprising a debris shield coupled to both the frame and the drive shaft.

6. The conveyor assembly of claim 5, wherein the debris shield includes a first end that overlaps a support surface of the frame, and a second end that includes a tube coupled to and disposed over a portion of the drive shaft.

7. The conveyor assembly of claim 1, wherein the drive shaft is configured to move with the first sliding plate, and the drive motor is configured to move with the second sliding plate.

8. The conveyor assembly of claim 2, further comprising an operating rod configured to be moved by the hydraulic actuator, wherein the operating rod is coupled to the first sliding plate.

9. The conveyor assembly of claim 3, wherein the first set of rails and the second set of rails each protrude laterally from the wall.

* * * * *